US012566313B2

(12) United States Patent
Sun et al.

(10) Patent No.: US 12,566,313 B2
(45) Date of Patent: Mar. 3, 2026

(54) CAMERA OPTICAL LENS

(71) Applicant: AAC Optics (Suzhou) Co., Ltd., Jiangsu (CN)

(72) Inventors: Qun Sun, Suzhou (CN); Shunda Zhou, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 304 days.

(21) Appl. No.: 18/533,241

(22) Filed: Dec. 8, 2023

(65) Prior Publication Data

US 2024/0345362 A1 Oct. 17, 2024

(30) Foreign Application Priority Data

Apr. 11, 2023 (CN) .......................... 202310376554.0

(51) Int. Cl.
*G02B 9/12* (2006.01)
*G02B 13/00* (2006.01)

(52) U.S. Cl.
CPC ........... *G02B 9/12* (2013.01); *G02B 13/0035* (2013.01)

(58) Field of Classification Search
CPC ...................................................... G02B 9/12
See application file for complete search history.

(56) References Cited

U.S. PATENT DOCUMENTS

2022/0244491 A1* 8/2022 Xie ........................... G02B 9/12
2022/0334358 A1* 10/2022 Huang ..................... G02B 9/12

* cited by examiner

*Primary Examiner* — Edmond C Lau
(74) *Attorney, Agent, or Firm* — Wiersch Law Group

(57) ABSTRACT

The present disclosure relates to the technical field of optical lens and discloses a camera optical lens. The camera optical lens includes three lenses, from an object side to an image side: a first lens having a negative refractive power; a second lens having a positive refractive power; and a third lens having a positive refractive power. Herein, the camera optical lens satisfies following conditions: $2.50 \leq f2/f \leq 3.50$; $5.00 \leq R1/R2 \leq 10.00$; $3.00 \leq d5/d4 \leq 8.20$; $1.65 \leq ET1/d1 \leq 2.10$; $-2.00 \leq R5/R6 \leq -5.00$. The camera optical lens has large aperture, wide angle and ultra-thinness while having good optical functions.

10 Claims, 10 Drawing Sheets

10

10

Longitudinal aberration mm

20

Longitudinal aberration mm

40

Longitudinal aberration

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors, PC lenses or vehicle-mounted lenses.

BACKGROUND

With the emergence of various smart devices in recent years, the demand for miniature camera optical lens is increasing day by day, and as the pixel size of the photo-sensitive devices become smaller, plus the current development trend of electronic products towards better functions and thinner and portable dimensions, miniature camera optical lens with good imaging quality therefore have become a mainstream in the market.

In order to acquire good imaging quality, a multi-lens structure is commonly applied. Besides, with technical development and increase of diversified user demands, in a case where a pixel size of a photosensitive device is getting smaller, while a demand for imaging quality by a system is increasing, a three-lens structure gradually emerge in lens design. A common three-lens structure lens has good optical functions, but there is still irrationality in provisions of focal power, lens space and lens shape of the three-lens structure lens, which renders that while a lens structure has good optical functions, a design requirement of large aperture and wide angle can not be satisfied.

SUMMARY

To address the above issues, the present disclosure seeks to provide a camera optical lens that satisfies a design requirement of large aperture, wide angle and ultra-thinness while having good optical functions.

In order to address the above issues, embodiments of the present disclosure provide a camera optical lens comprising three lenses, from an object side to an image side: a first lens having a negative refractive power; a second lens having a positive refractive power; and a third lens having a positive refractive power; wherein the camera optical lens satisfies following conditions: $2.50 \leq f2/f \leq 3.50$; $5.00 \leq R1/R2 \leq 10.00$; $3.00 \leq d5/d4 \leq 8.20$; $1.65 \leq ET1/d1 \leq 2.10$; and $-2.00 \leq R5/R6 \leq -5.00$; where f denotes a focal length of the camera optical lens; f2 denotes a focal length of the second lens; R1 denotes a central curvature radius of an object-side surface of the first lens; R2 denotes a central curvature radius of an image-side surface of the first lens; d4 denotes an on-axis distance from an image-side surface of the second lens to an object-side surface of the third lens; d5 denotes an on-axis thickness of the third lens; ET1 denotes an edge thickness of the first lens; d1 denotes an on-axis thickness of the first lens; R5 denotes a central curvature radius of the object-side surface of the third lens; and R6 denotes a central curvature radius of an image-side surface of the third lens.

As an improvement, the camera optical lens further satisfies following condition: $-1.60 \leq f1/f \leq -1.15$; where f1 denotes a focal length of the first lens.

As an improvement, the camera optical lens further satisfies following condition: $-1.50 \leq (R3+R4)/(R3-R4) \leq -1.20$; where R3 denotes a central curvature radius of an object-side surface of the second lens; and R4 denotes a central curvature radius of the image-side surface of the second lens.

As an improvement, the camera optical lens further satisfies following condition: $1.20 \leq f3/f \leq 1.40$; where f3 denotes a focal length of the third lens.

As an improvement, an object-side surface of the first lens is convex in a paraxial region and an image-side surface of the first lens is concave in the paraxial region; and the camera optical lens further satisfies following conditions: $0.61 \leq (R1+R2)/(R1-R2) \leq 2.22$; and $0.06 \leq d1/TTL \leq 0.22$; where TTL denotes a total optical length from the object-side surface of the first lens to an image surface of the camera optical lens along an optical axis.

As an improvement, an object-side surface of the second lens is convex in a paraxial region and an image-side surface of the second lens is concave in the paraxial region; and the camera optical lens further satisfies following condition: $0.08 \leq d3/TTL \leq 0.29$; where d3 denotes an on-axis thickness of the second lens; and TTL denotes a total optical length from the object-side surface of the first lens to an image surface of the camera optical lens along an optical axis.

As an improvement, the object-side surface of the third lens is convex in a paraxial region and the image-side surface of the third lens is convex in the paraxial region; and the camera optical lens further satisfies following conditions: $0.17 \leq (R5+R6)/(R5-R6) \leq 0.99$; and $0.12 \leq d5/TTL \leq 0.38$; where d5 denotes an on-axis thickness of the third lens; and TTL denotes a total optical length from the object-side surface of the first lens to an image surface of the camera optical lens along an optical axis.

As an improvement, a field of view FOV of the camera optical lens is greater than or equal to 117.00.

As an improvement, an F number FNO of the camera optical lens is less than or equal to 2.50.

As an improvement, the camera optical lens further satisfies following condition: $TTL/IH \leq 3.60$; where TTL denotes a total optical length from the object-side surface of the first lens to an image surface of the camera optical lens along an optical axis; and IH denotes an image height of the camera optical lens.

The present disclosure is advantageous in: the camera optical lens according to the present disclosure has good optical functions, satisfies design requirements of large aperture, wide angle and ultra-thinness, and is especially fit for a mobile phone camera optical lens component and a WEB camera lens composed by such camera elements as a charge coupled device (CCD) and a complementary metal oxide semiconductor (CMOS) for high pixels.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
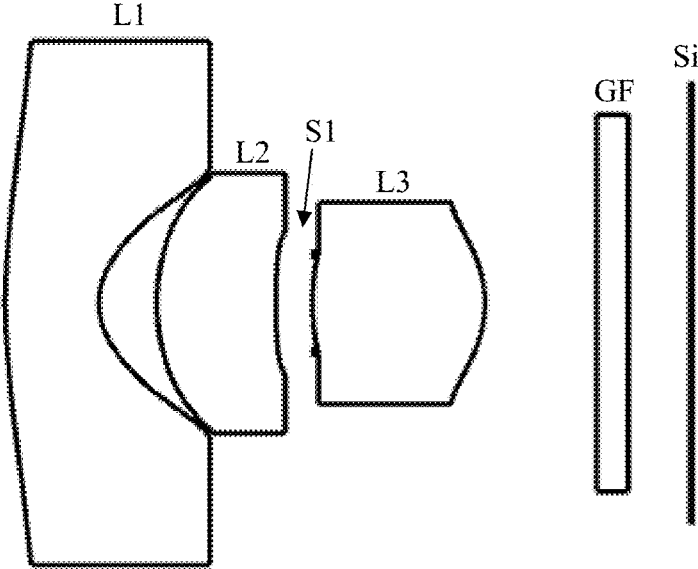
FIG. 1 is a schematic diagram of a structure of a camera optical lens according to Embodiment 1 of the present disclosure.

Referring to the accompanying drawings, the present disclosure provides a camera optical lens 10. FIG. 1 shows the camera optical lens 10 of Embodiment 1 of the present disclosure, and the camera optical lens 10 includes three lenses. Specifically, the camera optical lens 10 includes, from an object side to an image side: a first lens L1, a second lens L2, an aperture S1 and a third lens L3. An optical element such as an optical filter GF can be arranged between the third lens L3 and an image surface Si.

In this embodiment, the first lens L1 is plastic, the second lens L2 is plastic, and the third lens L3 is plastic. In an alternative embodiment, the first lens L1, the second lens L2 and the third lens L3 may be other materials.

A focal length f of the camera optical lens 10 is defined as f, a focal length of the second lens L2 is defined as f2, and the camera optical lens 10 satisfies a condition of $2.50 \leq f2/f \leq 3.50$, which specifies a ratio of the focal length f2 of the second lens L2 and the focal length f of the camera optical lens 10. Through reasonable distribution of the focal lengths of the camera optical lens 10, the camera optical lens 10 may have good imaging quality and lower sensitivity.

A central curvature radius of an object-side surface of the first lens L1 is defined as R1, a central curvature radius of an image-side surface of the first lens L1 is defined as R2, and the camera optical lens 10 satisfies a condition of $5.00 \leq R1/R2 \leq 10.00$, which specifies a shape of the first lens L1, mitigates deflection of light passing through the lens within a range of the condition, and effectively corrects chromatic aberration so that the chromatic aberration satisfies a condition of $|LC| \leq 5.0$ μm.

An on-axis distance from an image-side surface of the second lens L2 to an object-side surface of the third lens L3 is defined as d4, an on-axis thickness of the third lens L3 is defined as d5, and the camera optical lens 10 satisfies a condition of $3.00 \leq d5/d4 \leq 8.20$, which specifies a ratio of the on-axis distance d4 from the image-side surface of the second lens L2 to the object-side surface of the third lens L3 and the on-axis thickness d5 of the third lens L3. This range facilitates shortening an optical length of the camera optical lens 10.

An edge thickness of the first lens L1 is defined as ET1, an on-axis thickness of the first lens L1 is defined as d1, and the camera optical lens 10 satisfies a condition of $1.65 \leq ET1/d1 \leq 2.10$, which specifies a ratio of the edge thickness ET1 of the first lens L1 and the on-axis thickness d1. This range facilitates mitigating a change in an incident angle of a big-angle light, so that the light is transmitted in the camera optical lens 10 smoothly while maintaining a strength of a refractive power of the first lens L1 to improve the chromatic aberration and imaging quality.

A central curvature radius of the object-side surface of the third lens L3 is defined as R5, a central curvature radius of an image-side surface of the third lens L3 is defined as R6, and the camera optical lens 10 further satisfies a condition of $-2.00 \leq R5/R6 \leq -5.00$, which specifies a shape of the third lens L3. This range facilitates mitigating deflection of light passing through the lens within a range of the condition.

A focal length of the first lens L1 is defined as f1, and the camera optical lens 10 satisfies a condition of $-1.60 \leq f1/f \leq -1.15$, which specifies a ratio of the focal length f1 of the first lens L1 and the focal length f of the camera optical lens 10. By reasonably distributing optical focal lengths of the system, this range makes the camera optical lens 10 satisfy a design of large aperture and having good sensitivity.

A central curvature radius of an object-side surface of the second lens L2 is defined as R3, a central curvature radius of an image-side surface of the second lens L2 is defined as R4, and the camera optical lens 10 further satisfies a condition of $-1.50 \leq (R3+R4)/(R3-R4) \leq -1.20$, which specifies a shape of the second lens L2. This range facilitates correcting astigmatism and distortion of the camera optical lens 10, so that $|Distortion| \leq 10\%$, which reduces a possibility of vignetting.

A focal length of the third lens L3 is defined as f3, and the camera optical lens 10 satisfies a condition of $1.20 \leq f3/f \leq 1.40$, which specifies a ratio of the focal length f3 of the third lens L3 and the focal length f of the camera optical lens 10. This corrects aberration to guarantee imaging quality while effectively controlling a total optical length TTL of the camera optical lens 10.

In this embodiment, the first lens L1 has a negative refractive power. The object-side surface of the first lens L1 is convex in a paraxial region, and the image-side surface of the first lens L1 is concave in the paraxial region. In an alternative embodiment, the first lens L1 may also have a positive refractive power. The object-side surface and the image-side surface of the first lens L1 may alternatively be set as other distribution conditions of concave and convex surfaces.

The camera optical lens 10 satisfies a condition of 0.61≤(R1+R2)/(R1−R2)≤2.22. By reasonably controlling the shape of the first lens L1, the first lens L1 may effectively correct a system spherical aberration. Preferably, the camera optical lens 10 satisfies a condition of 0.98≤(R1+R2)/(R1−R2)≤1.78.

A total optical length of the camera optical lens 10 from the object-side surface of the first lens L1 to an image surface of the camera optical lens along an optical axis is defined as TTL, and the camera optical lens 10 satisfies a condition of 0.06≤d1/TTL≤0.22. This range facilitates achieving ultra-thinness. Preferably, the camera optical lens 10 satisfies a condition of 0.09≤d1/TTL≤0.18.

In an embodiment, the object-side surface of the second lens L2 is convex in the paraxial region, the image-side surface of the second lens L2 is concave in the paraxial region, and the second lens L2 has a positive refractive power. In an alternative embodiment, the second lens L2 may have a negative refractive power, and the object-side surface and image-side surface of the second lens L2 may be set as other distribution conditions of concave and convex surfaces.

An on-axis thickness of the second lens L2 is defines as d3, and the camera optical lens 10 further satisfies a condition of 0.08≤d3/TTL≤0.29. This range facilitates achieving ultra-thinness. Preferably, the camera optical lens 10 further satisfies a condition of 0.13≤d3/TTL≤0.23.

In this embodiment, the object-side surface of the third lens L3 is convex in the paraxial region, the image-side surface of the third lens L3 is convex in the paraxial region, and the third lens L3 has a positive refractive power. In an alternative embodiment, the third lens L3 may have a negative refractive power. The object-side surface and image-side surface of the third lens L3 may be set as other distribution conditions of concave and convex surfaces.

The third lens L3 is further defined as satisfying a condition of 0.17≤(R5+R6)/(R5−R6)≤0.99 which specifies the shape of the third lens L3. This range facilitates mitigating deflection of light passing through the lens and effectively correcting chromatic aberration. Preferably, the camera optical lens 10 further satisfies a condition of 0.26≤(R5+R6)/(R5−R6)≤0.79.

The camera optical lens 10 satisfies a condition of 0.12≤d5/TTL≤0.38, which specifies a ratio of the on-axis thickness d5 of the third lens L3 and a total optical lens TTL of the camera optical lens 10. This range facilitates shortening a total length of the camera optical lens 10. Preferably, the camera optical lens 10 further satisfies a condition of 0.19≤d5/TTL≤0.30.

In this embodiment, a field of view (FOV) of the camera optical lens 10 is greater than or equal to 117.00, so that wide angle is achieved.

In this embodiment, an F number (FNO) of the camera optical lens 10 is less than or equal to 2.50. Thus, a large aperture is achieved and the camera optical lens 10 has good imaging functions.

In this embodiment, an image height of the camera optical lens 10 is IH, and the camera optical lens 10 satisfies a condition of TTL/IH≤3.60, which facilitates achieving ultra-thinness.

The camera optical lens 10 has good optical functions, while satisfying a design of large aperture, wide angle and ultra-thinness. According to characteristics of the camera optical lens 10, the camera optical lens 10 is especially fit for a vehicle lens, a mobile phone camera optical lens component and a WEB camera lens composed by such camera elements as a charge coupled device (CCD) and a complementary metal oxide semiconductor (CMOS) for high pixels.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL: Total optical length (on-axis distance from the object-side surface of the first lens L1 to the image surface Si) of the camera optical lens 10 in mm.

F number FNO: A ratio of an effective focal length of the camera optical lens and an entrance pupil diameter.

Preferably, inflexion points and/or arrest points can be arranged on the object-side surface and/or the image-side surface of the lens, so as to satisfy the demand for high quality imaging. The description below can be referred to for specific implementations.

The design data of the camera optical lens 10 in Embodiment 1 of the present disclosure are shown in Table 1 and Table 2.

TABLE 1

|  | R |  | d |  | nd |  | vd |
|---|---|---|---|---|---|---|---|
| S1 | ∞ | d0= | −2.094 |  |  |  |  |
| R1 | 3.478 | d1= | 0.635 | nd1 | 1.5444 | v1 | 55.82 |
| R2 | 0.462 | d2= | 0.395 |  |  |  |  |
| R3 | 1.333 | d3= | 0.807 | nd2 | 1.6773 | v2 | 19.39 |
| R4 | 6.906 | d4= | 0.249 |  |  |  |  |
| R5 | 1.783 | d5= | 1.170 | nd3 | 1.5444 | v3 | 55.82 |
| R6 | −0.752 | d6= | 0.758 |  |  |  |  |
| R7 | ∞ | d7= | 0.210 | ndg | 1.5168 | vg | 64.17 |
| R8 | ∞ | d8= | 0.433 |  |  |  |  |

In the table, meanings of various symbols will be described as follows.

S1: aperture;

R: curvature radius at a center of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the optical filter GF;

R8: central curvature radius of the image-side surface of the optical filter GF;

d: on-axis thickness of a lens or an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the optical filter GF;

d7: on-axis thickness of the optical filter GF;

d8: on-axis distance from the image-side surface of the optical filter GF to the image surface Si;

nd: refractive index of the d line (the d line is a green light having a wavelength of 940 nm);

nd1: refractive index of the d line of the first lens L1;

nd2: refractive index of the d line of the second lens L2;

nd3: refractive index of the d line of the third lens L3;

ndg: refractive index of the d line of the optical filter GF;

vd: abbe number;

v1: abbe number of the first lens L1;

v2: abbe number of the second lens L2;

v3: abbe number of the third lens L3;

vg: abbe number of the optical filter GF.

Table 2 shows aspherical surface data of the camera optical lens 10 in Embodiment 1 of the present disclosure.

Table 3 shows design data of inflexion points of the camera optical lens 10 according to Embodiment 1 of the present disclosure. Herein, P1R1 and P1R2 respectively represent the object-side surface and the image-side surface of the first lens L1. P2R1 and P2R2 respectively represent the object-side surface and the image-side surface of the second lens L2. P3R1 and P3R2 respectively represent the object-side surface and the image-side surface of the third lens L3. The data in the column named "inflexion point position" refer to vertical distances from inflexion points arranged on each lens surface to the optic axis of the camera optical lens 10.

TABLE 3

| | Inflexion point number | Inflexion point position 1 | Inflexion point position 2 | Inflexion point position 3 |
|---|---|---|---|---|
| P1R1 | 3 | 1.145 | 1.585 | 1.775 |
| P1R2 | 3 | 0.725 | 0.825 | 0.845 |
| P2R1 | 1 | 0.865 | / | / |
| P2R2 | 0 | / | / | / |
| P3R1 | 1 | 0.345 | / | / |
| P3R2 | 1 | 0.505 | / | / |

Figure 2:
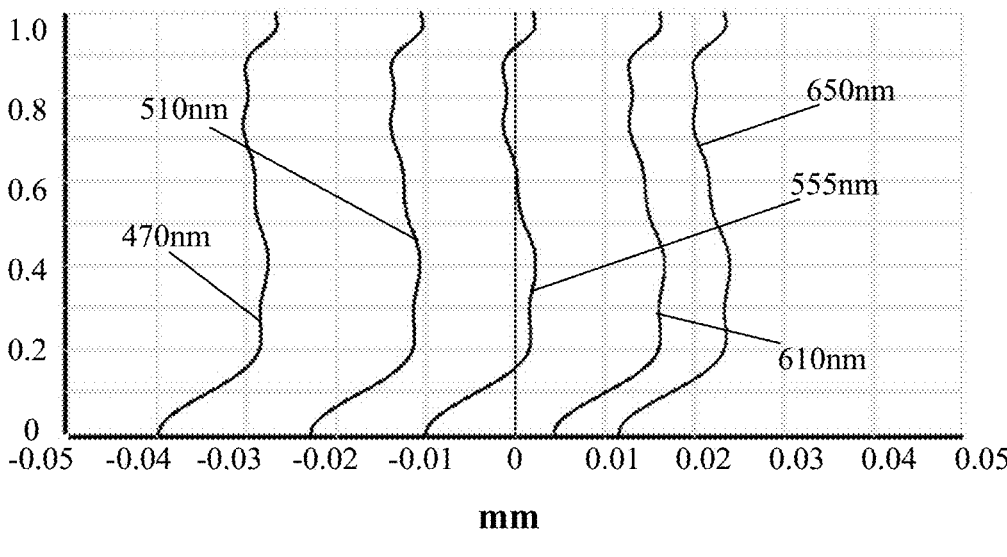
FIG. 2 is a schematic diagram of a longitudinal aberration of the camera optical lens shown in FIG. 1.
Figure 3:
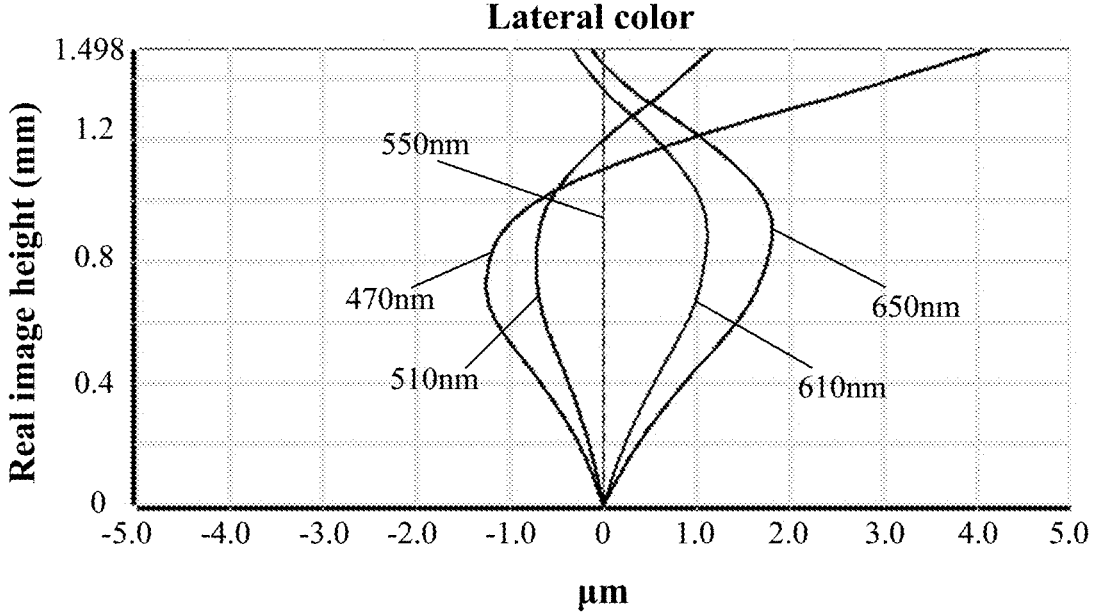
FIG. 3 is a schematic diagram of a lateral color of the camera optical lens shown in FIG. 1.
Figure 4:
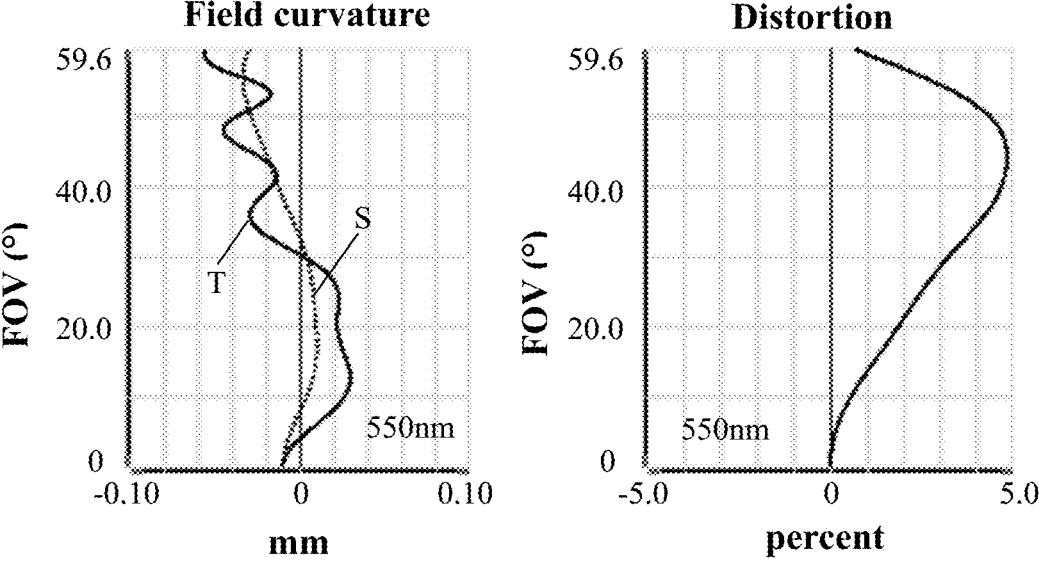
FIG. 4 is a schematic diagram of a field curvature and a distortion of the camera optical lens shown in FIG. 1.

FIG. 2 and FIG. 3 illustrate a longitudinal aberration and a lateral color with wavelengths of 470 nm, 510 nm, 550 nm, 610 nm and 650 nm after passing the camera optical lens 10 according to Embodiment 1, respectively. FIG. 4 illustrates a field curvature and a distortion with a wavelength of 555 nm after passing the camera optical lens 10 according to

TABLE 2

| | Conic coefficient | Aspherical surface coefficients | | | | |
|---|---|---|---|---|---|---|
| | k | A4 | A6 | A8 | A10 | A12 |
| R1 | −9.8117E+01 | 3.8696E−02 | −1.7331E−02 | 6.3976E−03 | −1.3990E−03 | 6.5821E−04 |
| R2 | −2.6893E+00 | 3.5102E−01 | −8.3943E−02 | −4.6733E−03 | −3.5246E−03 | 8.4450E−04 |
| R3 | −7.9443E+00 | 1.8444E−01 | 2.5361E−03 | −6.1760E−03 | −6.0441E−04 | −1.6506E−03 |
| R4 | −2.0429E+01 | 4.5485E−02 | 4.7672E−03 | 4.9280E−04 | 1.1542E−04 | −1.4023E−04 |
| R5 | −2.5098E+01 | 9.4357E−03 | −2.0396E−04 | −5.8450E−06 | 1.5504E−05 | −1.3099E−05 |
| R6 | −3.7577E+00 | −1.8653E−02 | 2.1158E−02 | −4.4220E−05 | −4.2538E−05 | 1.3977E−04 |

| | Conic coefficient | Aspherical surface coefficients | | | |
|---|---|---|---|---|---|
| | k | A14 | A16 | A18 | A20 |
| R1 | −9.8117E+01 | −1.2243E−03 | 7.4554E−04 | −6.7366E−04 | 3.5173E−04 |
| R2 | −2.6893E+00 | −4.1363E−03 | −1.3913E−03 | 5.1391E−04 | 1.5334E−03 |
| R3 | −7.9443E+00 | −2.3215E−03 | −1.3635E−03 | −6.0126E−05 | 4.4612E−04 |
| R4 | −2.0429E+01 | −1.1201E−04 | −5.7253E−05 | −2.8685E−05 | −1.5591E−05 |
| R5 | −2.5098E+01 | 1.1007E−05 | −9.4900E−06 | 3.7748E−06 | −5.7078E−06 |
| R6 | −3.7577E+00 | −1.5303E−04 | 4.2057E−05 | −1.9646E−05 | 1.0764E−05 |

For convenience, an aspherical surface of each lens surface is an aspherical surface shown in the below formula (1). However, the present disclosure is not limited to the aspherical polynomials form shown in the formula (1).

$$z=(cr^2)/\{1+[1-(k+1)(c^2r^2)]^{1/2}\}+A4r^4+A6r^6+A8r^8+ \\ A10r^{10}+A12r^{12}+A14r^{14}+A16r^{16}+A18r^{18}+A20r^{20} \quad (1)$$

Herein, k is a conic coefficient, A4, A6, A8, A10, A12, A14, A16, A18 and A20 are aspherical surface coefficients, c is a curvature at a center of the optical surface, r is a vertical distance from a point on an aspherical surface curve to the optical axis, and z is an aspherical surface depth (a vertical distance between a point on the aspherical surface which is of the distance of r from the optical axis, and a tangent surface that is tangent with a top point of the optical axis of the aspherical surface).

Embodiment 1. A field curvature S in FIG. 4 is a field curvature in a sagittal direction, and T is a field curvature in a tangential direction.

Table 17 shows values in the Embodiments 1, 2, 3, 4 and contrasting embodiment corresponding to the parameters specified in the conditions.

As shown in Table 17, Embodiment 1 satisfies the conditions.

In this embodiment, an entrance pupil diameter ENPD of the camera optical lens 10 is 0.395 mm, an image height IH of 1.0H is 1.498 mm, and an FOV (field of view) in a diagonal direction is 119.29°. Thus, the camera optical lens 10 satisfies a design requirement of large aperture, wide angle and ultra-thinness, and has good optical functions.

9

Embodiment 2

Embodiment 2 is basically the same as Embodiment 1 and involves symbols having the same meanings as Embodiment 1, and only differences therebetween will be described in the following.

Figure 5:
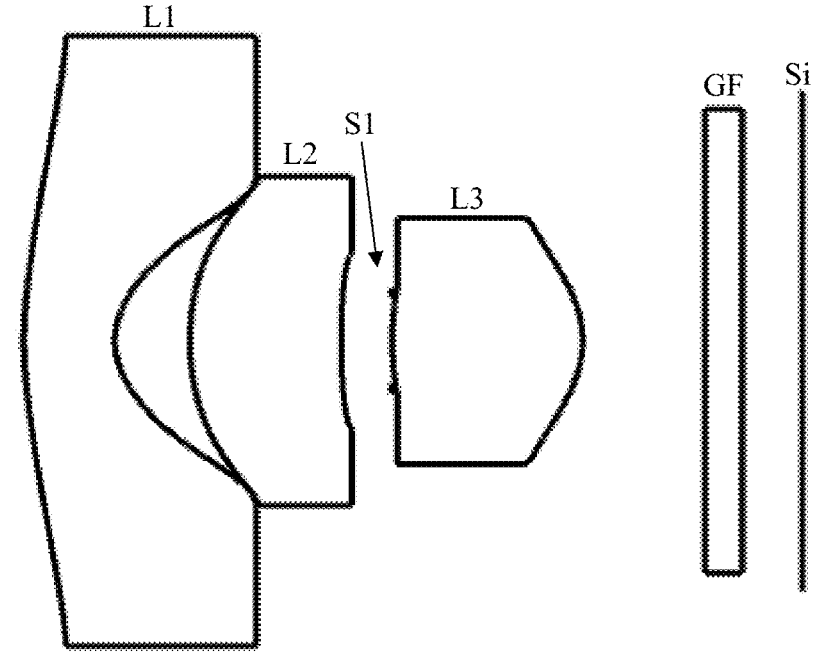
FIG. 5 is a schematic diagram of a structure of a camera optical lens according to Embodiment 2 of the present disclosure.

FIG. 5 is a camera optical lens 20 according to Embodiment 2 of the present disclosure.

Table 4 and Table 5 show design data of a camera optical lens 20 in Embodiment 2 of the present disclosure.

TABLE 4

|  | R |  | d |  | nd |  | vd |
|---|---|---|---|---|---|---|---|
| S1 | ∞ | d0= | −2.052 |  |  |  |  |
| R1 | 2.345 | d1= | 0.508 | nd1 | 1.5444 | v1 | 55.82 |
| R2 | 0.455 | d2= | 0.419 |  |  |  |  |
| R3 | 1.575 | d3= | 0.845 | nd2 | 1.6773 | v2 | 19.39 |
| R4 | 15.196 | d4= | 0.284 |  |  |  |  |
| R5 | 1.855 | d5= | 1.062 | nd3 | 1.5444 | v3 | 55.82 |
| R6 | −0.653 | d6= | 0.689 |  |  |  |  |
| R7 | ∞ | d7= | 0.210 | ndg | 1.5168 | vg | 64.17 |
| R8 | ∞ | d8= | 0.345 |  |  |  |  |

Table 5 shows aspherical surface data of each lens of the camera optical lens 20 in Embodiment 2 of the present disclosure.

TABLE 5

| | Conic coefficient | Aspherical surface coefficients | | | | |
|---|---|---|---|---|---|---|
| | k | A4 | A6 | A8 | A10 | A12 |
| R1 | −4.9533E+01 | 3.5197E−01 | −1.0532E+00 | 1.6135E+00 | −1.3411E+00 | 4.5783E−01 |
| R2 | −1.8081E+00 | 2.6700E−01 | 4.5497E−01 | −3.6826E−01 | −4.9924E−01 | 2.8984E−01 |
| R3 | 2.2804E−01 | 7.9825E−02 | 4.8767E−03 | −1.5179E−02 | −1.0387E−02 | −6.5404E−03 |
| R4 | 2.9196E+02 | 4.4172E−02 | −8.1097E−03 | −4.4493E−03 | 8.7509E−04 | 2.7120E−03 |
| R5 | −1.2903E+01 | 1.6782E−03 | −5.0843E−04 | 1.9137E−03 | 8.2663E−04 | 3.1595E−03 |
| R6 | −8.8442E−01 | 8.2612E−02 | 1.5455E−02 | 1.8814E−02 | 9.8342E−03 | 3.5785E−03 |

| | Conic coefficient | Aspherical surface coefficients | | | |
|---|---|---|---|---|---|
| | k | A14 | A16 | A18 | A20 |
| R1 | −4.9533E+01 | 3.3337E−03 | 2.5516E−04 | −5.0562E−03 | −1.1193E−02 |
| R2 | −1.8081E+00 | −3.6760E−03 | 3.0822E−03 | 3.9719E−03 | 5.4386E−03 |
| R3 | 2.2804E−01 | −5.5162E−03 | 8.5894E−04 | 2.9308E−03 | −4.1443E−03 |
| R4 | 2.9196E+02 | −6.4408E−04 | 4.8971E−03 | 5.3638E−03 | −4.3528E−03 |
| R5 | −1.2903E+01 | −4.5786E−04 | −1.4493E−03 | −2.1725E−03 | −3.8571E−03 |
| R6 | −8.8442E−01 | 2.1968E−03 | −2.8654E−03 | −2.7779E−02 | 6.7729E−03 |

Table 6 shows inflexion point design data of lenses in the camera optical lens 20 in Embodiment 2 of the present disclosure.

TABLE 6

|  | Inflexion point number | Inflexion point position 1 | Inflexion point position 2 |
|---|---|---|---|
| P1R1 | 1 | 1.135 | / |
| P1R2 | 1 | 0.725 | / |
| P2R1 | 1 | 0.855 | / |
| P2R2 | 0 | / | / |
| P3R1 | 1 | 0.295 | / |
| P3R2 | 2 | 0.525 | 0.645 |

Figure 6:
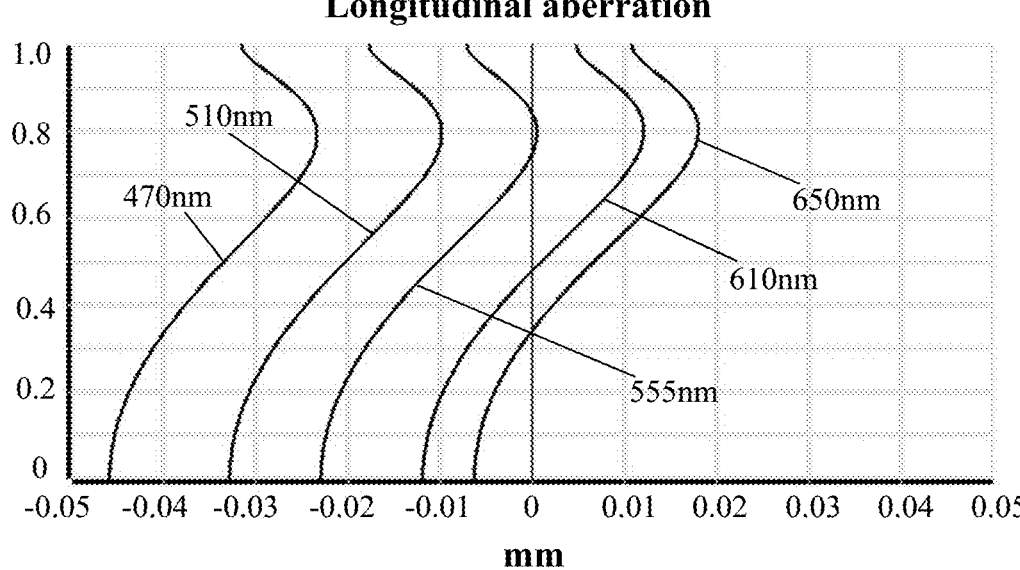
FIG. 6 is a schematic diagram of a longitudinal aberration of the camera optical lens shown in FIG. 5.
Figure 7:
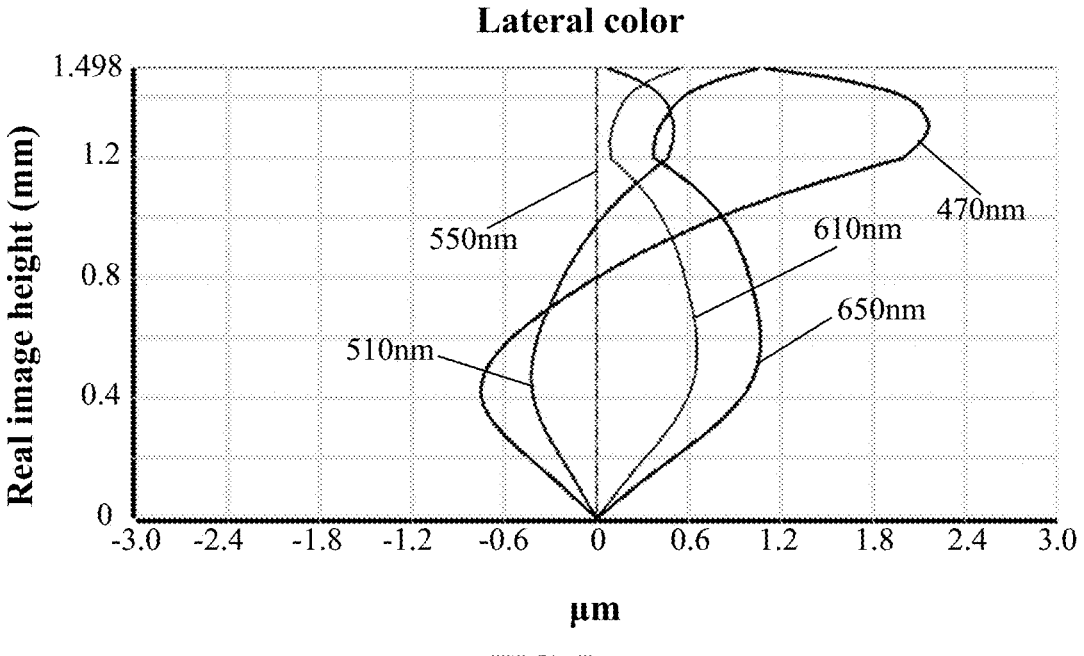
FIG. 7 is a schematic diagram of a lateral color of the camera optical lens shown in FIG. 5.
Figure 8:
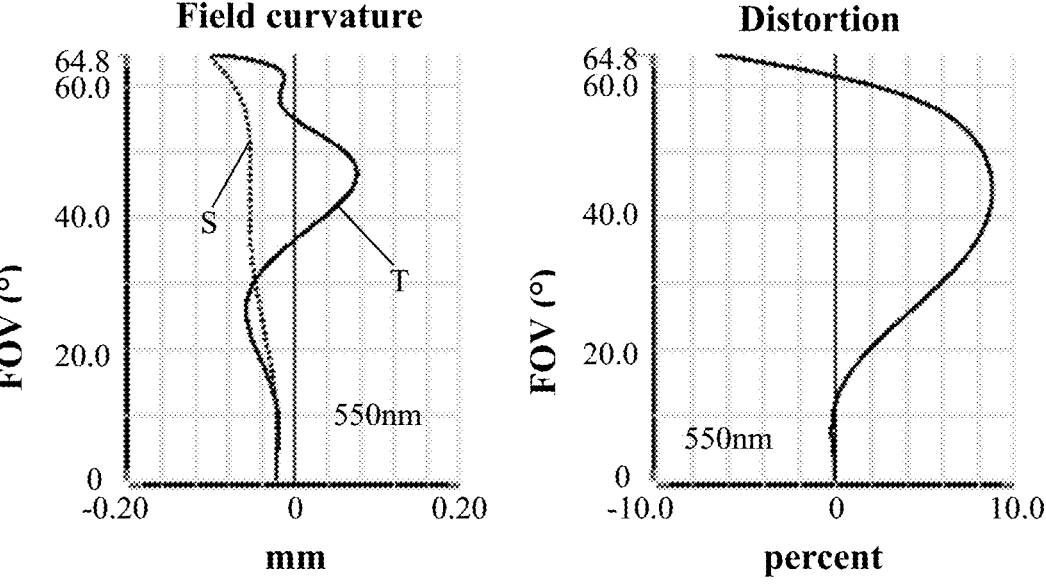
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 470 nm, 510 nm, 550 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2. A field curvature S in FIG. 8 is a field curvature in a sagittal direction, and T is a field curvature in a tangential direction.

As shown in Table 17, Embodiment 2 satisfies the conditions.

In this embodiment, an entrance pupil diameter ENPD of the camera optical lens 20 is 0.339 mm, an image height IH of 1.0H is 1.498 mm, and an FOV (field of view) in a diagonal direction is 129.80°. Thus, the camera optical lens 20 satisfies a design requirement of large aperture, wide angle and ultra-thinness, and has good optical functions.

Embodiment 3

Embodiment 3 is basically the same as Embodiment 1 and involves symbols having the same meanings as Embodiment 1, and only differences therebetween will be described in the following.

Figure 9:
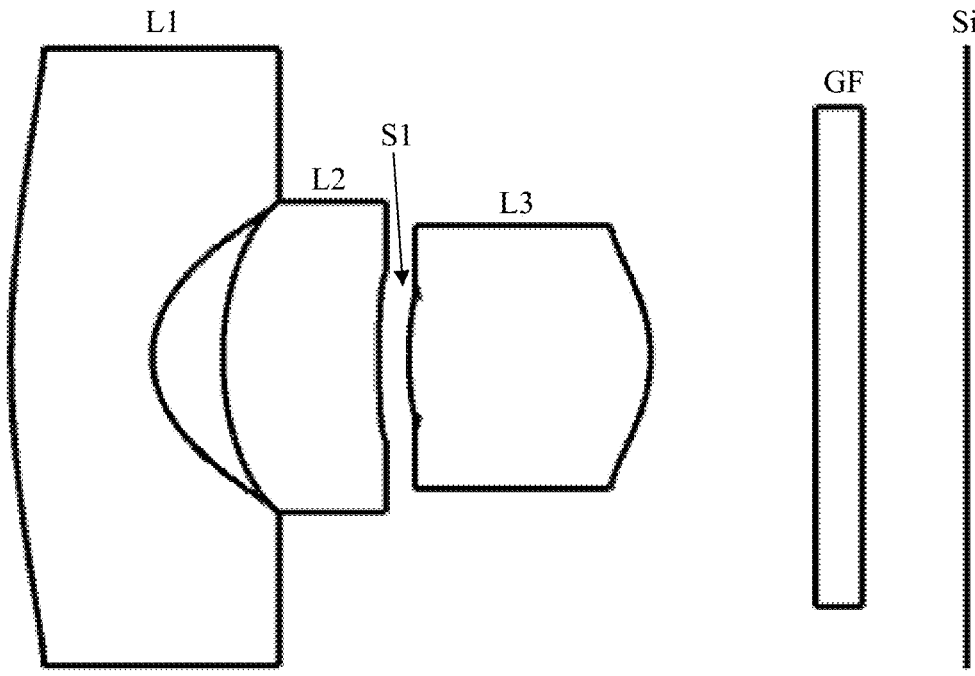
FIG. 9 is a schematic diagram of a structure of a camera optical lens according to Embodiment 3 of the present disclosure.

FIG. 9 is a camera optical lens 30 according to Embodiment 3 of the present disclosure.

Table 7 and Table 8 show design data of the camera optical lens 30 in Embodiment 3 of the present disclosure.

TABLE 7

|  | R |  | d |  | nd |  | vd |
|---|---|---|---|---|---|---|---|
| S1 | ∞ | d0= | −1.826 |  |  |  |  |
| R1 | 4.716 | d1= | 0.635 | nd1 | 1.5444 | v1 | 55.82 |
| R2 | 0.486 | d2= | 0.318 |  |  |  |  |
| R3 | 1.536 | d3= | 0.701 | nd2 | 1.6773 | v2 | 19.39 |
| R4 | 7.342 | d4= | 0.134 |  |  |  |  |
| R5 | 1.483 | d5= | 1.087 | nd3 | 1.5444 | v3 | 55.82 |
| R6 | −0.745 | d6= | 0.741 |  |  |  |  |
| R7 | ∞ | d7= | 0.210 | ndg | 1.5168 | vg | 64.17 |
| R8 | ∞ | d8= | 0.469 |  |  |  |  |

Table 8 shows aspherical surface data of each lens of the camera optical lens 30 in Embodiment 3 of the present disclosure.

TABLE 8

| Conic coefficient | Aspherical surface coefficients | | | | |
|---|---|---|---|---|---|
| k | A4 | A6 | A8 | A10 | A12 |
| R1 | −5.4117E+01 | 3.2324E−01 | −1.0178E+00 | 1.6498E+00 | −1.3253E+00 | 4.6089E−01 |
| R2 | −1.3420E+00 | 2.7815E−01 | 4.3773E−01 | −4.3086E−01 | −5.9136E−01 | 1.6835E−01 |
| R3 | 5.5662E−01 | 5.7118E−02 | 1.7019E−02 | 2.6268E−02 | 8.5653E−02 | 4.5411E−02 |
| R4 | −4.0768E+03 | 4.9230E−02 | −1.9480E−02 | 3.1082E−02 | 7.9850E−02 | 6.0711E−02 |
| R5 | 6.8595E+00 | −1.2675E−02 | 6.5508E−03 | 8.3495E−03 | 1.1972E−02 | 1.1726E−02 |
| R6 | −7.8860E−01 | 8.0701E−02 | 7.1431E−02 | 2.0000E−02 | 7.1502E−03 | 1.0739E−02 |

| Conic coefficient | Aspherical surface coefficients | | | |
|---|---|---|---|---|
| k | A14 | A16 | A18 | A20 |
| R1 | −5.4117E+01 | −4.8588E−02 | −1.6308E−01 | −2.1427E−01 | −4.3710E−01 |
| R2 | −1.3420E+00 | −1.7703E−01 | −4.9968E−02 | −2.0064E−01 | −4.0643E−02 |
| R3 | 5.5662E−01 | 7.4766E−02 | 3.5237E−02 | −6.0652E−02 | −8.5231E−02 |
| R4 | −4.0768E+03 | 2.8570E−02 | −5.0218E−03 | −6.7153E−02 | −1.9256E−01 |
| R5 | 6.8595E+00 | −7.7509E−03 | −2.0266E−02 | −2.0133E−02 | −2.1239E−02 |
| R6 | −7.8860E−01 | −6.1609E−03 | −1.2381E−03 | 4.4718E−03 | −2.8273E−02 |

Table 9 shows inflexion point design data of lenses in the camera optical lens 30 in Embodiment 3 of the present disclosure.

TABLE 9

| | Inflexion point number | Inflexion point position 1 |
|---|---|---|
| P1R1 | 1 | 1.195 |
| P1R2 | 1 | 0.655 |
| P2R1 | 0 | / |
| P2R2 | 0 | / |
| P3R1 | 1 | 0.275 |
| P3R2 | 1 | 0.445 |

Figure 10:
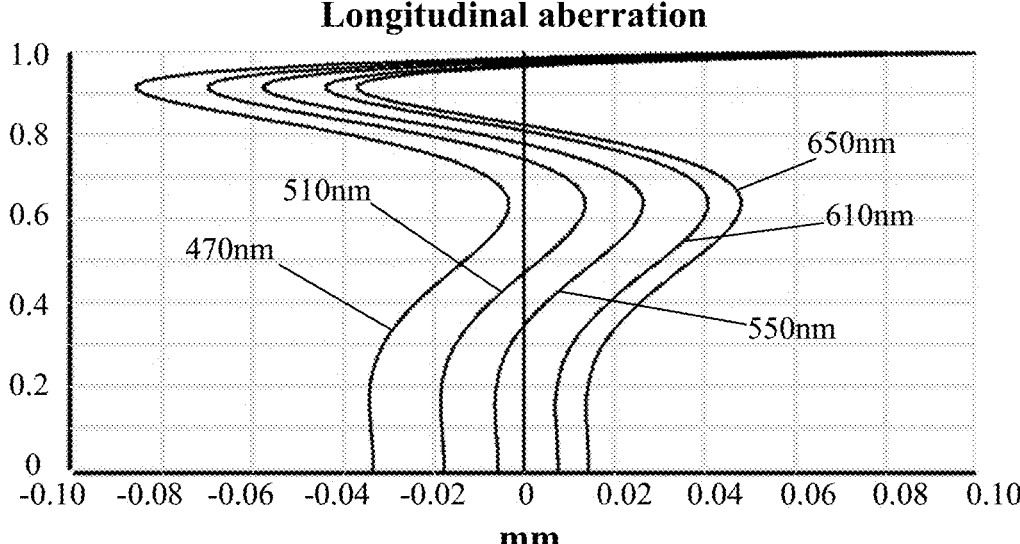
FIG. 10 is a schematic diagram of a longitudinal aberration of the camera optical lens shown in FIG. 9.
Figure 11:
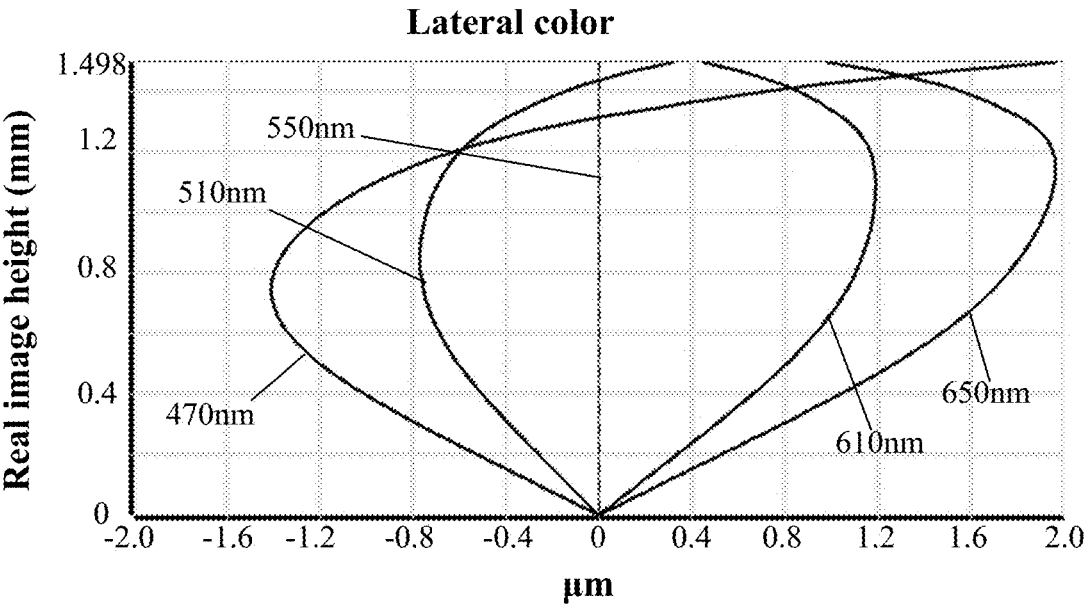
FIG. 11 is a schematic diagram of a lateral color of the camera optical lens shown in FIG. 9.
Figure 12:
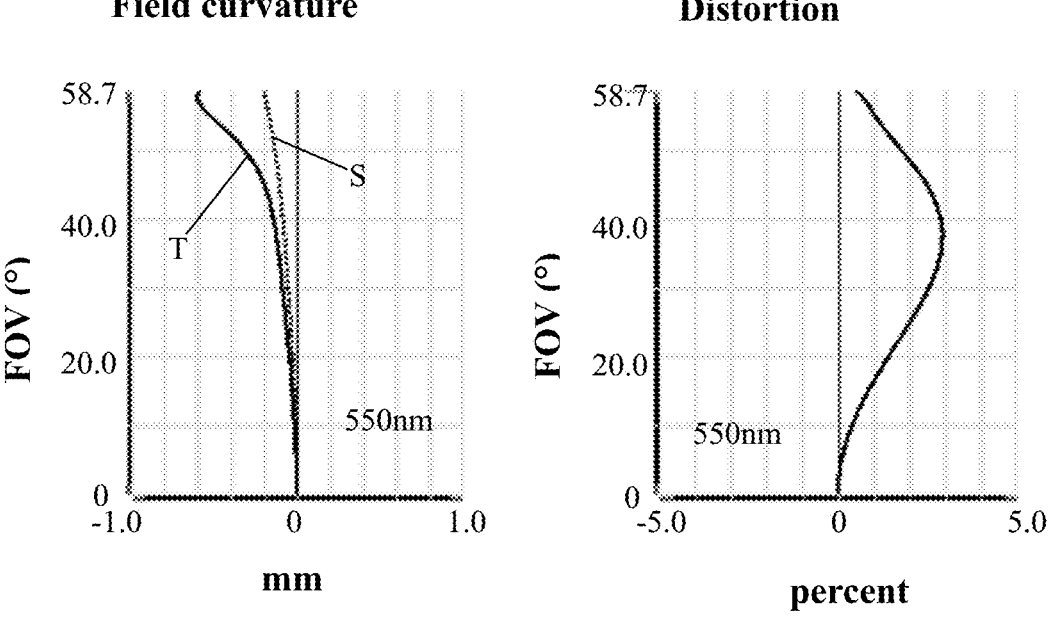
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 470 nm, 510 nm, 550 nm, 610 nm and 650 nm after passing the camera optical lens 30 according to Embodiment 3. FIG. 12 illustrates a field curvature and a distortion of light with a wavelength of 555 nm after passing the camera optical lens 30 according to Embodiment 3. A field curvature S in FIG. 12 is a field curvature in a sagittal direction, and T is a field curvature in a tangential direction.

As shown in Table 17, Embodiment 3 satisfies the conditions.

In this embodiment, an entrance pupil diameter ENPD of the camera optical lens 30 is 0.371 mm, an image height IH of 1.0H is 1.498 mm, and an FOV (field of view) in a diagonal direction is 117.57°. Thus, the camera optical lens 30 satisfies a design requirement of large aperture, wide angle and ultra-thinness, and has good optical functions.

Embodiment 4

Embodiment 4 is basically the same as Embodiment 1 and involves symbols having the same meanings as Embodiment 1, and only differences therebetween will be described in the following.

Figure 13:
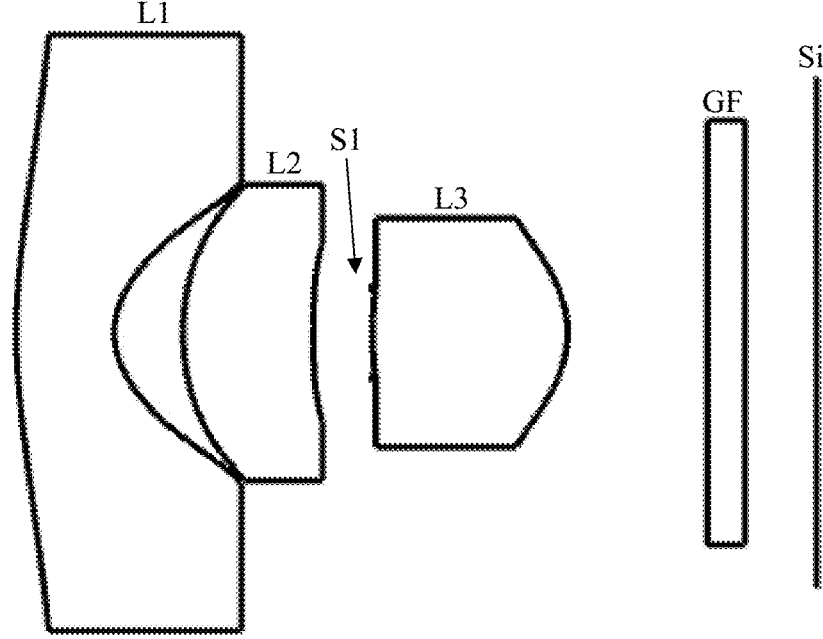
FIG. 13 is a schematic diagram of a structure of a camera optical lens according to Embodiment 4 of the present disclosure.

FIG. 13 is a camera optical lens 40 according to Embodiment 4.

Table 10 and Table 11 show design data of a camera optical lens 40 in Embodiment 4 of the present disclosure.

TABLE 10

| | R | | d | | nd | | vd |
|---|---|---|---|---|---|---|---|
| S1 | ∞ | d0= | −1.982 | | | | |
| R1 | 2.817 | d1= | 0.547 | nd1 | 1.5444 | v1 | 55.82 |
| R2 | 0.456 | d2= | 0.384 | | | | |
| R3 | 1.489 | d3= | 0.725 | nd2 | 1.6773 | v2 | 19.39 |
| R4 | 7.390 | d4= | 0.331 | | | | |
| R5 | 3.107 | d5= | 1.085 | nd3 | 1.5444 | v3 | 55.82 |
| R6 | −0.632 | d6= | 0.777 | | | | |
| R7 | ∞ | d7= | 0.210 | ndg | 1.5168 | vg | 64.17 |
| R8 | ∞ | d8= | 0.401 | | | | |

Table 11 shows aspherical surface data of each lens of the camera optical lens 40 in Embodiment 4 of the present disclosure.

TABLE 11

| Conic coefficient | Aspherical surface coefficients | | | | |
|---|---|---|---|---|---|
| k | A4 | A6 | A8 | A10 | A12 |
| R1 | −7.8521E+01 | 3.1642E−01 | −1.0367E+00 | 1.6241E+00 | −1.3409E+00 | 4.5526E−01 |
| R2 | −1.8714E+00 | 2.4771E−01 | 4.5355E−01 | −3.7025E−01 | −5.0165E−01 | 2.8896E−01 |
| R3 | 1.2642E−01 | 9.7879E−02 | 1.1917E−02 | −1.7923E−02 | −9.9673E−03 | −8.5779E−03 |
| R4 | 1.9647E+02 | 3.7189E−02 | −1.0342E−02 | −8.1333E−03 | −5.5362E−03 | 8.4194E−04 |
| R5 | 6.1312E+00 | 1.2085E−02 | −6.0304E−03 | −4.7044E−03 | −4.5962E−03 | −9.7519E−04 |
| R6 | −9.2892E−01 | 8.2077E−02 | 1.3138E−03 | 1.8646E−03 | 4.0452E−03 | 1.1975E−02 |

| Conic coefficient | Aspherical surface coefficients | | | |
|---|---|---|---|---|
| k | A14 | A16 | A18 | A20 |
| R1 | −7.8521E+01 | 2.6384E−03 | 9.5749E−04 | −1.9130E−03 | −5.7143E−03 |
| R2 | −1.8714E+00 | −2.6637E−04 | 4.1923E−03 | −3.9052E−03 | −1.8414E−04 |

TABLE 11-continued

| | | | | |
|---|---|---|---|---|
| R3 | 1.2642E−01 | −5.6573E−03 | −6.6840E−03 | −5.8814E−04 | −9.1873E−03 |
| R4 | 1.9647E+02 | 3.6169E−03 | 2.6916E−03 | 4.4047E−03 | −5.4250E−03 |
| R5 | 6.1312E+00 | −3.1754E−03 | 1.1604E−02 | 1.9014E−02 | 3.5973E−02 |
| R6 | −9.2892E−01 | 1.2122E−02 | −1.3855E−03 | −1.0209E−02 | −1.3547E−03 |

Table 12 shows inflexion point design data of lenses in the camera optical lens 40 in Embodiment 4 of the present disclosure.

TABLE 12

| | Inflexion point number | Inflexion point position 1 |
|---|---|---|
| P1R1 | 1 | 1.015 |
| P1R2 | 1 | 0.715 |
| P2R1 | 1 | 0.815 |
| P2R2 | 0 | / |
| P3R1 | 0 | / |
| P3R2 | 1 | 0.565 |

Figure 14:
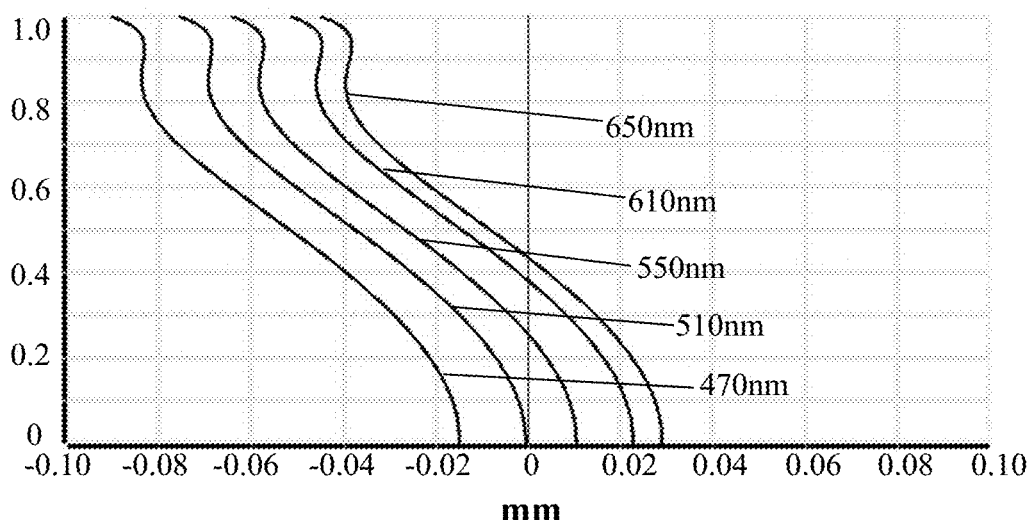
FIG. 14 is a schematic diagram of a longitudinal aberration of the camera optical lens shown in FIG. 13.
Figure 15:
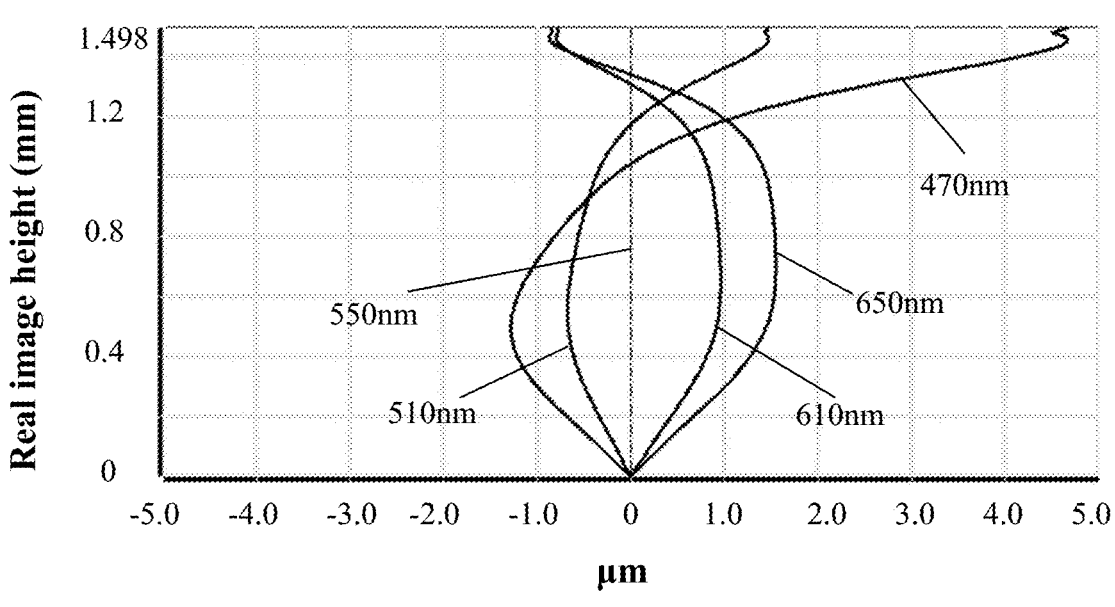
FIG. 15 is a schematic diagram of a lateral color of the camera optical lens shown in FIG. 13.
Figure 16:
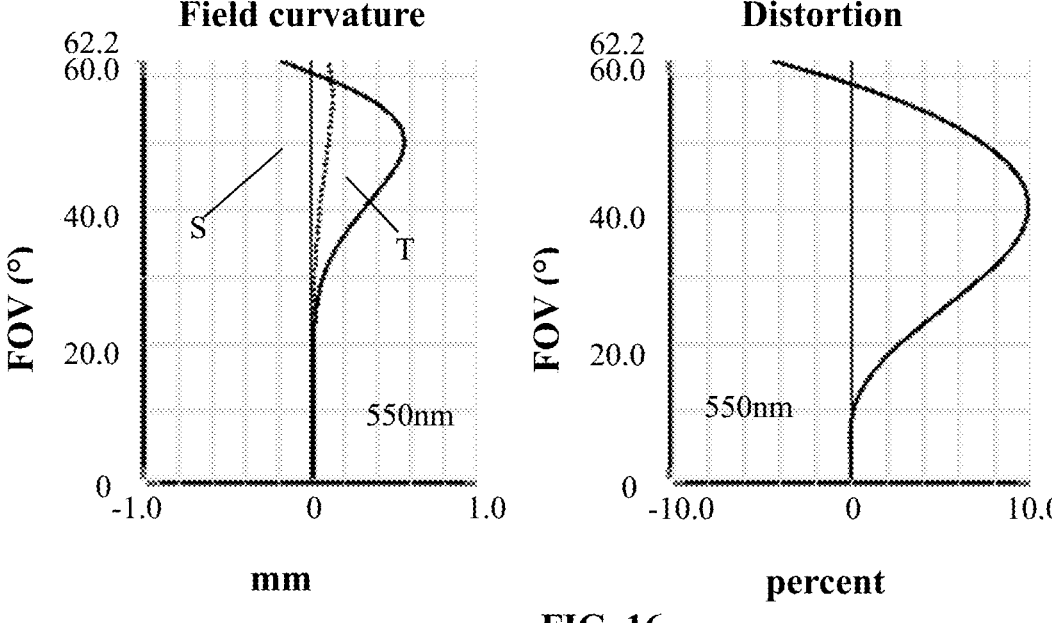
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 470 nm, 510 nm, 550 nm, 610 nm and 650 nm after passing the camera optical lens 40 according to Embodiment 4. FIG. 16 illustrates a field curvature and a distortion of light with a wavelength of 555 nm after passing the camera optical lens 40 according to Embodiment 4. A field curvature S in FIG.

Figure 17:
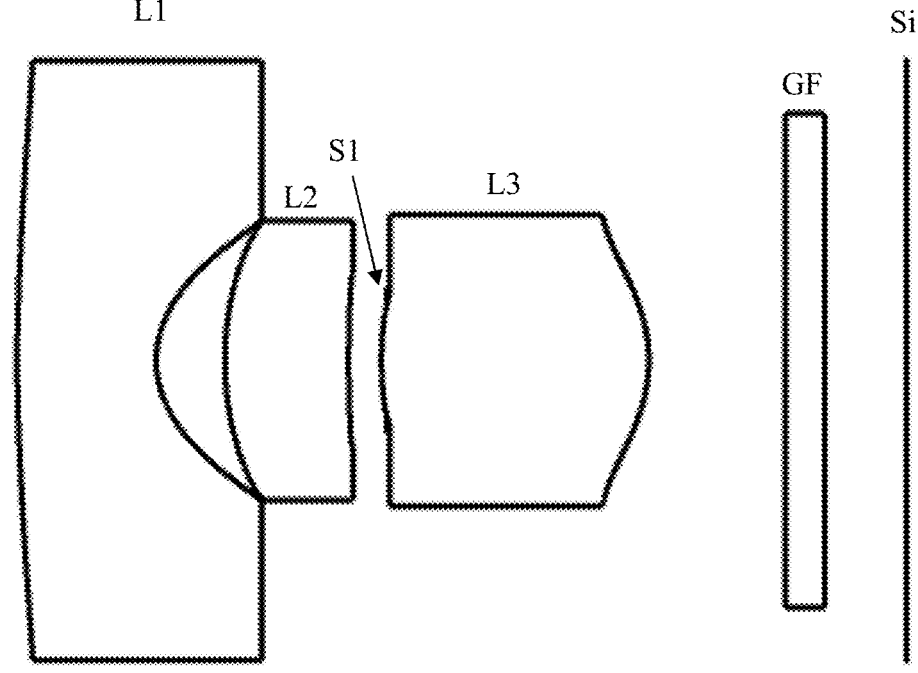
FIG. 17 is a schematic diagram of a structure of a camera optical lens according to a contrasting embodiment.

FIG. 17 is a camera optical lens 50 according to the contrasting embodiment.

Table 13 and Table 14 show design data of the camera optical lens 50 in the contrasting embodiment of the present disclosure.

TABLE 13

| | R | | d | | nd | | vd |
|---|---|---|---|---|---|---|---|
| S1 | ∞ | d0= | −2.007 | | | | |
| R1 | 5.712 | d1= | 0.754 | nd1 | 1.5444 | v1 | 55.82 |
| R2 | 0.476 | d2= | 0.373 | | | | |
| R3 | 1.505 | d3= | 0.672 | nd2 | 1.6773 | v2 | 19.39 |
| R4 | 12.218 | d4= | 0.177 | | | | |
| R5 | 1.519 | d5= | 1.450 | nd3 | 1.5444 | v3 | 55.82 |
| R6 | −0.750 | d6= | 0.743 | | | | |
| R7 | ∞ | d7= | 0.210 | ndg | 1.5168 | vg | 64.17 |
| R8 | ∞ | d8= | 0.443 | | | | |

Table 14 shows aspherical surface data of each lens of the camera optical lens 50 in the contrasting embodiment of the present disclosure.

TABLE 14

| | Conic coefficient | Aspherical surface coefficients | | | | |
|---|---|---|---|---|---|---|
| | k | A4 | A6 | A8 | A10 | A12 |
| R1 | −5.3967E+02 | 3.2059E−01 | −1.0128E+00 | 1.6474E+00 | −1.3242E+00 | 4.5801E−01 |
| R2 | −1.2883E+00 | 2.8394E−01 | 4.2576E−01 | −4.6051E−01 | −5.9566E−01 | 1.8977E−01 |
| R3 | 7.2988E−02 | 1.4389E−02 | 1.6199E−03 | 1.6720E−02 | 3.0396E−02 | 6.2467E−02 |
| R4 | 4.3255E+02 | 3.7103E−02 | −2.8529E−02 | −4.5607E−02 | −1.0599E−02 | 2.8458E−02 |
| R5 | −1.5071E+00 | −5.2046E−03 | 2.8915E−03 | 9.2683E−03 | 1.0417E−02 | 5.4278E−03 |
| R6 | −5.5213E−01 | 5.3612E−02 | 6.7199E−02 | 3.7132E−02 | 3.0145E−03 | −1.4493E−02 |

| | Conic coefficient | Aspherical surface coefficients | | | |
|---|---|---|---|---|---|
| | k | A14 | A16 | A18 | A20 |
| R1 | −5.3967E+02 | −8.9690E−03 | −3.1236E−02 | −7.6464E−02 | −1.8038E−01 |
| R2 | −1.2883E+00 | −1.1929E−01 | −4.6285E−02 | −2.3871E−01 | 8.0482E−01 |
| R3 | 7.2988E−02 | 6.1550E−02 | 1.1717E−01 | 1.3777E−01 | 1.6376E−01 |
| R4 | 4.3255E+02 | 6.1789E−02 | 5.3554E−02 | 3.2134E−02 | −2.9326E−03 |
| R5 | −1.5071E+00 | 6.2000E−03 | 1.3418E−03 | −1.4580E−02 | −7.1394E−03 |
| R6 | −5.5213E−01 | −1.2530E−02 | −7.9327E−03 | 6.5320E−03 | 3.6502E−03 |

16 is a field curvature in a sagittal direction, and T is a field curvature in a tangential direction.

As shown in Table 17, Embodiment 4 satisfies the conditions.

In this embodiment, an entrance pupil diameter ENPD of the camera optical lens 40 is 0.308 mm, an image height IH of 1.0H is 1.498 mm, and an FOV (field of view) in a diagonal direction is 124.40°. Thus, the camera optical lens 40 satisfies a design requirement of large aperture, wide angle and ultra-thinness, and has good optical functions.

Contrasting Embodiment

The contrasting embodiment involves symbols having the same meanings as Embodiment 1, and only differences therebetween will be described in the following.

Table 15 and Table 16 show design data of inflexion points and arrest points of lenses in the camera optical lens 50 in the contrasting embodiment of the present disclosure. The data in the column named "arrest point position" refer to vertical distances from arrest points arranged on each lens surface to the optic axis of the camera optical lens 50.

TABLE 15

| | Inflexion point number | Inflexion point position 1 |
|---|---|---|
| P1R1 | 1 | 1.305 |
| P1R2 | 1 | 0.665 |
| P2R1 | 0 | / |

TABLE 15-continued

|  | Inflexion point number | Inflexion point position 1 |
|---|---|---|
| P2R2 | 0 | / |
| P3R1 | 1 | 0.315 |
| P3R2 | 1 | 0.495 |

TABLE 16

|  | Arrest point number | Arrest point position 1 |
|---|---|---|
| P1R1 | 1 | 1.545 |
| P1R2 | 0 | / |
| P2R1 | 0 | / |
| P2R2 | 0 | / |
| P3R1 | 0 | / |
| P3R2 | 0 | / |

Figure 18:
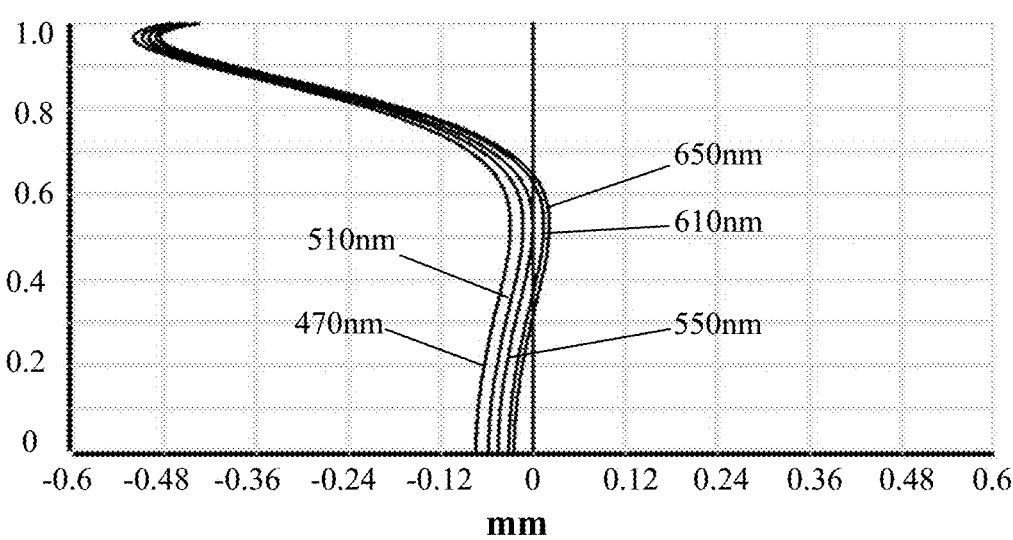
FIG. 18 is a schematic diagram of a longitudinal aberration of the camera optical lens shown in FIG. 17.
Figure 19:
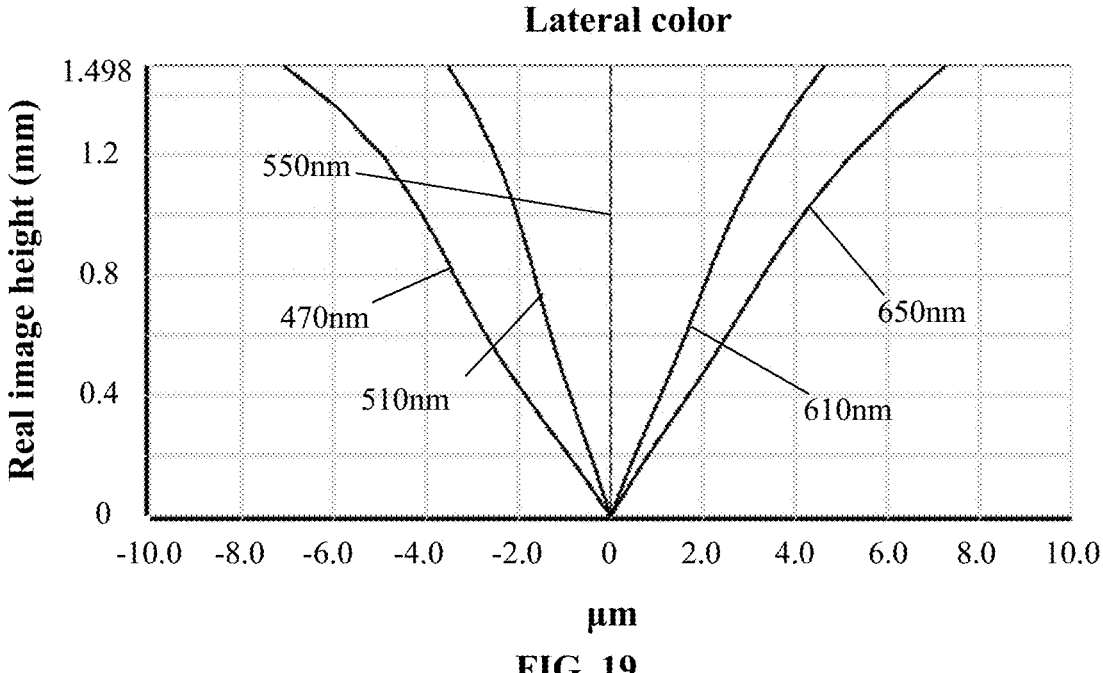
FIG. 19 is a schematic diagram of a lateral color of the camera optical lens shown in FIG. 17.
Figure 20:
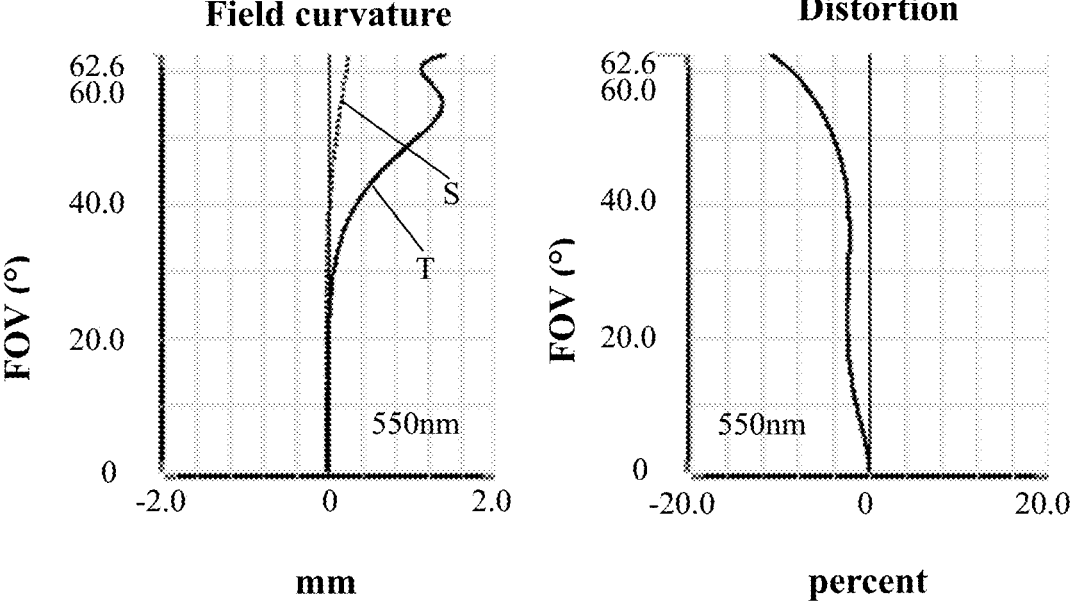
FIG. 20 is a schematic diagram of a field curvature and a distortion of the camera optical lens shown in FIG. 17.

FIG. 18 and FIG. 19 illustrate a longitudinal aberration and a lateral color of light with wavelengths of 470 nm, 510 nm, 550 nm, 610 nm and 650 nm after passing the camera optical lens 50 according to the contrasting embodiment. FIG. 20 illustrates a field curvature and a distortion of light with a wavelength of 555 nm after passing the camera optical lens 50 according to the contrasting embodiment. A field curvature S in FIG. 20 is a field curvature in a sagittal direction, and T is a field curvature in a tangential direction.

Table 17 in the following lists values corresponding to the respective conditions in the contrasting embodiment according to the above conditions. Obviously, the camera optical lens 50 in the contrasting embodiment does not satisfy the above condition of 5.00≤R1/R2≤10.00.

In the contrasting embodiment, an entrance pupil diameter ENPD of the camera optical lens 50 is 0.388 mm, an image height IH of 1.0H is 1.498 mm, and an FOV (field of view) in the diagonal direction is 125.44°. Thus, the chromatic aberration of the camera optical lens 50 is not fully corrected and optical functions of the camera optical lens 50 is not outstanding.

TABLE 17

| Parameters and conditions | Embodiment 1 | Embodiment 2 | Embodiment 3 | Embodiment 4 | Contrasting Embodiment |
|---|---|---|---|---|---|
| f2/f | 2.656 | 3.390 | 3.024 | 3.401 | 2.896 |
| R1/R2 | 7.530 | 5.154 | 9.702 | 6.174 | 11.999 |
| d5/d4 | 4.699 | 3.745 | 8.111 | 3.277 | 8.200 |
| ET1/d1 | 1.900 | 2.092 | 1.662 | 1.959 | 1.651 |
| R5/R6 | −2.371 | −2.842 | −1.990 | −4.916 | −2.025 |
| f | 0.868 | 0.747 | 0.904 | 0.771 | 0.854 |
| f1 | −1.053 | −1.141 | −1.047 | −1.085 | −1.001 |
| f2 | 2.305 | 2.532 | 2.734 | 2.622 | 2.473 |
| f3 | 1.157 | 1.039 | 1.096 | 1.071 | 1.187 |
| FNO | 2.199 | 2.204 | 2.437 | 2.503 | 2.201 |
| TTL | 4.656 | 4.362 | 4.295 | 4.460 | 4.822 |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising three lenses, from an object side to an image side:
    a first lens having a negative refractive power;
    a second lens having a positive refractive power; and
    a third lens having a positive refractive power;
    wherein the camera optical lens satisfies following conditions:

$$2.50 \leq f2/f \leq 3.50;$$

$$5.00 \leq R1/R2 \leq 10.00;$$

$$3.00 \leq d5/d4 \leq 8.20;$$

$$1.65 \leq ET1/d1 \leq 2.10; \text{ and}$$

$$-2.00 \leq R5/R6 \leq -5.00;$$

where
    f denotes a focal length of the camera optical lens;
    f2 denotes a focal length of the second lens;
    R1 denotes a central curvature radius of an object-side surface of the first lens;
    R2 denotes a central curvature radius of an image-side surface of the first lens;
    d4 denotes an on-axis distance from an image-side surface of the second lens to an object-side surface of the third lens;
    d5 denotes an on-axis thickness of the third lens;
    ET1 denotes an edge thickness of the first lens;
    d1 denotes an on-axis thickness of the first lens;
    R5 denotes a central curvature radius of the object-side surface of the third lens; and
    R6 denotes a central curvature radius of an image-side surface of the third lens.

2. The camera optical lens according to claim 1 further satisfying following condition:

$$-1.60 \leq f1/f \leq -1.15;$$

where
    f1 denotes a focal length of the first lens.

3. The camera optical lens according to claim 1 further satisfying following condition:

$$-1.50 \leq (R3+R4)/(R3-R4) \leq -1.20;$$

where
    R3 denotes a central curvature radius of an object-side surface of the second lens; and
    R4 denotes a central curvature radius of the image-side surface of the second lens.

4. The camera optical lens according to claim 1 further satisfying following condition:

$$1.20 \leq f3/f \leq 1.40;$$

where
    f3 denotes a focal length of the third lens.

5. The camera optical lens according to claim 1, wherein an object-side surface of the first lens is convex in a paraxial region and an image-side surface of the first lens is concave in the paraxial region; and
    the camera optical lens further satisfies following conditions:

$$0.61 \leq (R1+R2)/(R1-R2) \leq 2.22; \text{ and}$$

$$0.06 \leq d1/TTL \leq 0.22;$$

where
    TTL denotes a total optical length from the object-side surface of the first lens to an image surface of the camera optical lens along an optical axis.

6. The camera optical lens according to claim 1, wherein an object-side surface of the second lens is convex in a paraxial region and an image-side surface of the second lens is concave in the paraxial region; and the camera optical lens further satisfies following condition:

$$0.08 \le d3/\text{TTL} \le 0.29;$$

where d3 denotes an on-axis thickness of the second lens; and

TTL denotes a total optical length from the object-side surface of the first lens to an image surface of the camera optical lens along an optical axis.

7. The camera optical lens according to claim 1, wherein the object-side surface of the third lens is convex in a paraxial region and the image-side surface of the third lens is convex in the paraxial region; and the camera optical lens further satisfies following conditions:

$$0.17 \le (R5+R6)/(R5-R6) \le 0.99; \text{ and}$$

$$0.12 \le d5/\text{TTL} \le 0.38;$$

where d5 denotes an on-axis thickness of the third lens; and

TTL denotes a total optical length from the object-side surface of the first lens to an image surface of the camera optical lens along an optical axis.

8. The camera optical lens according to claim 1, wherein a field of view FOV of the camera optical lens is greater than or equal to 117.00.

9. The camera optical lens according to claim 1, wherein an F number FNO of the camera optical lens is less than or equal to 2.50.

10. The camera optical lens according to claim 1 further satisfying following condition:

$$\text{TTL}/\text{IH} \le 3.60;$$

where

TTL denotes a total optical length from the object-side surface of the first lens to an image surface of the camera optical lens along an optical axis; and IH denotes an image height of the camera optical lens.

\* \* \* \* \*